US012802706B2

(12) United States Patent
Liu

(10) Patent No.: US 12,802,706 B2
(45) Date of Patent: Nov. 17, 2026

(54) METHOD FOR DRIVING FACE OF VIRTUAL IMAGE, ELECTRONIC DEVICE, AND NON-TRANSITORY READABLE STORAGE MEDIUM

(71) Applicant: VIVO MOBILE COMMUNICATION CO., LTD., Dongguan (CN)

(72) Inventor: Xin Liu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 84 days.

(21) Appl. No.: 19/180,572

(22) Filed: Apr. 16, 2025

(65) Prior Publication Data

US 2026/0162670 A1 Jun. 11, 2026

Related U.S. Application Data

(63) Continuation of application No. PCT/CN2023/126582, filed on Oct. 25, 2023.

(30) Foreign Application Priority Data

Oct. 27, 2022 (CN) ......................... 202211325775.7

(51) Int. Cl.
*G10L 21/00* (2013.01)
*G06T 13/20* (2011.01)
(Continued)

(52) U.S. Cl.
CPC ............ *G10L 21/10* (2013.01); *G06T 13/205* (2013.01); *G06T 13/40* (2013.01); *G10L 2021/105* (2013.01)

(58) Field of Classification Search
None
See application file for complete search history.

(56) References Cited

U.S. PATENT DOCUMENTS 6,539,354 B1 * 3/2003 Sutton ..................... G10L 13/00 704/E21.02
7,979,280 B2 * 7/2011 Wouters .................. G10L 13/07 704/260

(Continued)

FOREIGN PATENT DOCUMENTS

CN 109377540 A 2/2019
CN 110853614 A 2/2020

(Continued)

OTHER PUBLICATIONS

Charalambous et al., "Audio-driven emotional speech animation for interactive virtual characters", Comput Anim Virtual Worlds, 2019, 11 pages, vol. 30.

(Continued)

*Primary Examiner* — Martin Mushambo
(74) *Attorney, Agent, or Firm* — The Webb Law Firm

(57) ABSTRACT

This application discloses a method for driving a face of a virtual image, which includes obtaining first input information, where the first input information includes at least one piece of speech information and text information; generating speech-text alignment information based on the first input information; determining, based on the speech-text alignment information, N phonemes corresponding to the first input information, where the phonemes include phoneme information, and N is an integer greater than 1; generating a first drive parameter sequence based on the phonemes, the phoneme information, and a mapping relationship between a facial viseme in the virtual image and the phoneme; and driving the face of the virtual image based on the first drive parameter sequence.

20 Claims, 2 Drawing Sheets

(51) Int. Cl.

| | |
|---|---|
| ***G06T 13/40*** | (2011.01) |
| ***G10L 21/10*** | (2013.01) |

(56) References Cited

U.S. PATENT DOCUMENTS

| | | | | |
|---|---|---|---|---|
| 10,497,362 | B2 * | 12/2019 | Raghavendra .......... | G10L 13/08 |
| 2002/0024519 | A1 * | 2/2002 | Park ........................ | G06T 13/40 345/473 |
| 2002/0059180 | A1 * | 5/2002 | Aoki ................ | H04N 21/44226 |
| 2005/0203739 | A1 * | 9/2005 | Hwang ................... | G10L 13/08 704/254 |
| 2008/0183473 | A1 * | 7/2008 | Nagano ................... | G10L 13/07 704/E13.011 |
| 2009/0157408 | A1 * | 6/2009 | Kim ........................ | G10L 13/08 704/E13.011 |
| 2016/0365085 | A1 * | 12/2016 | Raghavendra .......... | G10L 13/08 |

FOREIGN PATENT DOCUMENTS

| | | | |
|---|---|---|---|
| CN | 111145322 | A | 5/2020 |
| CN | 111459450 | A | 7/2020 |
| CN | 111460785 | A | 7/2020 |
| CN | 111508064 | A | 8/2020 |
| CN | 112927712 | A | 6/2021 |
| CN | 113538636 | A | 10/2021 |
| CN | 113539240 | A | 10/2021 |
| CN | 115312030 | A | 11/2022 |
| CN | 115662388 | A | 1/2023 |

OTHER PUBLICATIONS

Fried et al., “Text-based Editing of Talking-head Video”, ACM Trans. Graph., Jul. 2019, 14 pages, vol. 38:4.

* cited by examiner

METHOD FOR DRIVING FACE OF VIRTUAL IMAGE, ELECTRONIC DEVICE, AND NON-TRANSITORY READABLE STORAGE MEDIUM

CROSS-REFERENCE TO RELATED APPLICATIONS

This application is a Bypass Continuation application of International Patent Application No. PCT/CN2023/126582 filed Oct. 25, 2023, and claims priority to Chinese Patent Application No. 202211325775.7, filed Oct. 27, 2022, the disclosures of which are hereby incorporated by reference in their entireties.

BACKGROUND OF THE INVENTION

Field of the Invention

This application belongs to the field of artificial intelligence technologies, and to a method for driving a face of a virtual image, an electronic device, and a non-transitory readable storage medium.

Description of Related Art

With development of artificial intelligence technologies and big data technologies, an application scope of a virtual image is increasingly wide. For example, a virtual image may be constructed, and a facial expression of the virtual image is driven to simulate human speech.

In the related art, when a facial expression of a virtual image is driven, each text corresponding to a speech segment is one by one aligned with a mouth-shape action corresponding to facial data, to generate lip-shape drive data corresponding to each text, so that a lip shape of the virtual image is driven to change.

SUMMARY OF THE INVENTION

This application provides a method for driving a face of a virtual image, an electronic device, and a non-transitory readable storage medium.

According to a first aspect, an embodiment of this application provides a method for driving a face of a virtual image. The method includes: obtaining first input information, where the first input information includes at least one piece of speech information and text information; generating speech-text alignment information based on the first input information; determining, based on the speech-text alignment information, N phonemes corresponding to the first input information, where the phonemes include phoneme information, and N is an integer greater than 1; generating a first drive parameter sequence based on the phonemes, the phoneme information, and a mapping relationship between a facial viseme in the virtual image and the phoneme; and driving the face of the virtual image based on the first drive parameter sequence.

According to a second aspect, an embodiment of this application provides an apparatus for driving a face of a virtual image. The apparatus includes an obtaining module, a generation module, a determining module, and an execution module. The obtaining module is configured to obtain first input information, where the first input information includes at least one piece of speech information and text information. The generation module is configured to generate speech-text alignment information based on the first input information obtained by the obtaining module. The determining module is configured to determine, based on the speech-text alignment information generated by the generation module, N phonemes corresponding to the first input information, where the phonemes include phoneme information, and N is an integer greater than 1. The generation module is further configured to generate a first drive parameter sequence based on the phonemes determined by the determining module, the phoneme information, and a mapping relationship between a facial viseme in the virtual image and the phoneme. The execution module is configured to drive the face of the virtual image based on the first drive parameter sequence generated by the generation module.

According to a third aspect, an embodiment of this application provides an electronic device, including a processor and a memory. The memory stores a program or instructions that can be run on the processor, and when the program or instructions are executed by the processor, steps of the method in the first aspect are implemented.

According to a fourth aspect, an embodiment of this application provides a non-transitory readable storage medium, storing a program or instructions. When the program or instructions are executed by a processor, steps of the method in the first aspect are implemented.

According to a fifth aspect, an embodiment of this application provides a chip, including a processor and a communication interface. The communication interface is coupled to the processor. The processor is configured to run a program or instructions, to implement the method in the first aspect.

According to a sixth aspect, an embodiment of this application provides a computer program product. The program product is stored in a non-transitory storage medium, and the program product is executed by at least one processor to implement the method in the first aspect.

DESCRIPTION OF THE INVENTION

Figure 1:
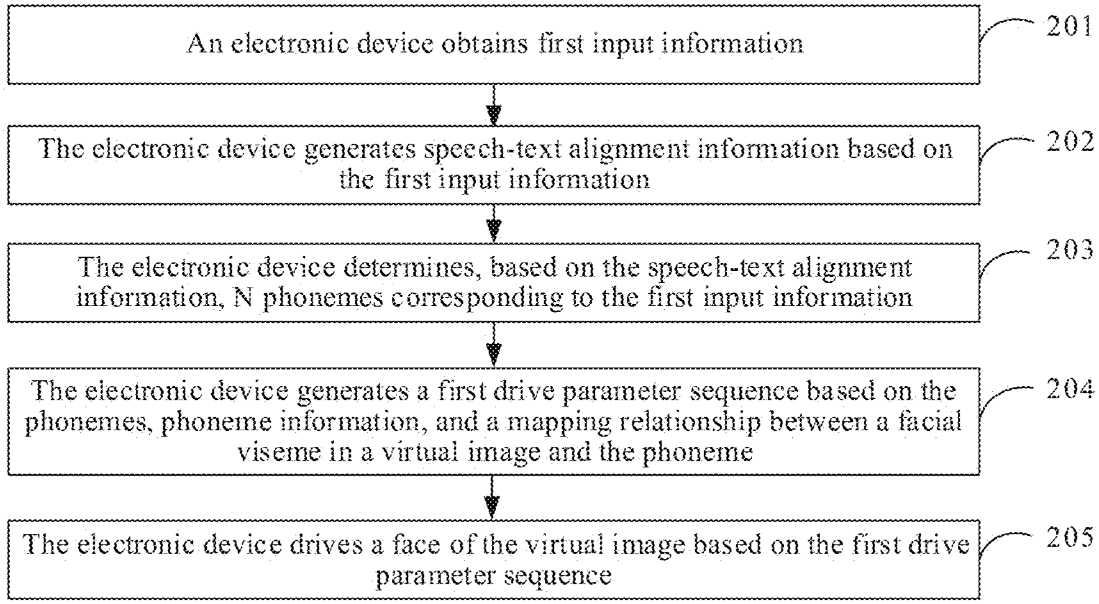
FIG. 1 is a schematic flowchart of a method for driving a face of a virtual image according to an embodiment of this application.

The following clearly describes the technical solutions in embodiments of this application with reference to the accompanying drawings in embodiments of this application. It is clear that the described embodiments are a part but not all of embodiments of this application. All other embodiments obtained by a person of ordinary skill in the art based on the embodiments this application shall fall within the protection scope of this application.

The terms "first", "second", and the like in this specification and the claims of this application are intended to distinguish between similar objects, instead of describing a particular sequence or order. It should be understood that the terms used in such a way are interchangeable in proper circumstances, so that the embodiments of this application can be implemented in a sequence other than the sequence illustrated or described herein. Objects distinguished by "first", "second", and the like are usually of one type, and a quantity of objects is not limited. For example, there may be one or more first objects. In addition, "and/or" in this specification and the claims represents at least one of connected objects. The character "/" usually indicates an "or" relationship between associated objects.

A method and an apparatus for driving a face of a virtual image, an electronic device, and a non-transitory readable storage medium that are provided in the embodiments of this application are described below with reference to the accompanying drawings by using embodiments and application scenarios thereof.

Usually, when generating face drive data for driving a virtual image, an electronic device first generates, based on inputted text or speech information, speech-text alignment information including only the text information, then obtains a lip-shape action corresponding to the text information, and finally generates lip-shape drive data for driving the virtual image. However, in this solution, because the text information cannot accurately express a lip action corresponding to a speech segment, the finally generated lip-shape drive data is not fine, and lip-shape jitter occurs. As a result, a change finally presented in the lip shape is inconsistent, resulting in a poor final synchronization effect.

According to the method and apparatus for driving a face of a virtual image, the electronic device, and the non-transitory readable storage medium that are provided in the embodiments of this application, an electronic device may obtain first input information, where the first input information includes at least one piece of speech information and text information; generate speech-text alignment information based on the first input information; determine, based on the speech-text alignment information, N phonemes corresponding to the first input information, where the phonemes include phoneme information, and N is an integer greater than 1; generate a first drive parameter sequence based on the phonemes, the phoneme information, and a mapping relationship between a facial viseme in the virtual image and the phoneme; and drive the face of the virtual image based on the first drive parameter sequence. In this way, because the phoneme information of the N phonemes can accurately express a facial mouth shape, corresponding to the first input information, of the virtual image, a more accurate first drive parameter sequence can be generated to drive the face of the virtual image. Therefore, an uncoordinated action of the presented facial mouth shape of the virtual image is avoided, and a final synchronization effect is improved.

An execution body of the method for driving a face of a virtual image provided in this embodiment may be an apparatus for driving a face of a virtual image. The apparatus for driving a face of a virtual image may be an electronic device, or may be a control module, a processing module, or the like in the electronic device. The technical solutions provided in the embodiments of this application are described below by using the electronic device as an example.

An embodiment of this application provides a method for driving a face of a virtual image. As shown in FIG. 1, the method for driving a face of a virtual image may include the following step 201 to step 205.

Step 201: An electronic device obtains first input information.

In this embodiment of this application, the first input information includes at least one piece of speech information and text information.

In this embodiment of this application, the first input information is for indicating to-be-expressed content of the virtual image.

In this embodiment of this application, the virtual image may include a virtual character generated by the electronic device.

Step 202: The electronic device generates speech-text alignment information based on the first input information.

In this embodiment of this application, the electronic device may align the speech information with text information corresponding to the speech information, to generate the speech-text alignment information.

In this embodiment of this application, the speech-text alignment information is for indicating start time and end time of each text in the text information.

Step 203: The electronic device determines, based on the speech-text alignment information, N phonemes corresponding to the first input information.

In this embodiment of this application, the phonemes include phoneme information.

N is an integer greater than 1.

In this embodiment of this application, the phoneme information may be pinyin information corresponding to the text in the text information.

For example, the pinyin information may be divided into an initial and a vowel.

It should be noted that the vowel may include a single vowel, a compound vowel, an alveolar nasal vowel, and a velar nasal vowel.

In this embodiment of this application, the electronic device may divide the N phonemes into a single vowel, a compound vowel, an alveolar nasal vowel, a velar nasal vowel, a syllable to be recognized and read as a whole, and a triple-piece syllable. Then, the triple-piece syllable and the syllable to be recognized and read as a whole each are split into a combination of the first four vowels, to generate a corresponding phoneme group.

Step 204: The electronic device generates a first drive parameter sequence based on the phonemes, the phoneme information, and a mapping relationship between a facial viseme in the virtual image and the phoneme.

In this embodiment of this application, the facial viseme may be a part or a muscle of the face of the virtual image.

For example, the facial viseme may include a chin part viseme, a mouth part viseme, and another part viseme.

It should be noted that the chin part viseme and the mouth part viseme are for determining lip-shape movement, and the another part viseme is for determining facial expression movement in an eye, a nose, an eyebrow, or the like.

For example, the chin part viseme may include a premaxilla, a right mandible, a left mandible, and a mandible.

For example, the mouth part viseme may include a mouth being closed, a mouth twisting, a mouth twitching, a right part of a mouth, a left part of a mouth, a left part of a mouth laughing, a right part of a mouth laughing, a mouth wrinkling to the left, a mouth wrinkling to the right, a dimple at a left part of a mouth bending, a dimple at a right part of a mouth bending, a mouth extending to the left, a mouth extending to the right, a mouth downward rolling, a mouth upward rolling, a lower lip shaking, an upper lip shaking, pressing a left part of a mouth, pressing a right part of a mouth, a lower left part of a mouth, a lower right part of a mouth, an upper left part of a mouth, and an upper right part of a mouth.

For example, the another part viseme may include: a left eye blinking, a left eye downward viewing, a left eye inward viewing, a left eye outward viewing, a left eye upward viewing, a left eye squinting, a left eye wide opening, a right eye blinking, a right eye downward viewing, a right eye inward viewing, a right eye outward viewing, a right eye upward viewing, a right eye squinting, a right eye wide opening, a left eyebrow downward moving, a right eyebrow downward moving, an inner side of an eyebrow upward moving, an outer side of a left eyebrow upward moving, an outer side of a right eyebrow upward moving, a cheek turning pick, a cheek obliquing left, a cheek obliquing right, a nose moving left, a nose moving right, and a tongue being put out.

In this embodiment of this application, the mapping relationship may be pre-stored in the electronic device, or may be obtained from a network side.

How to generate the mapping relationship is described below by using an example.

For example, the electronic device may first determine, through statistics based on each phoneme and a video that is recorded by a real person, a real-person facial viseme action corresponding to each phoneme, and record a corresponding drive parameter, so that the virtual image is consistent with a facial action in the real-person video. Then, the electronic device establishes a one-to-one correspondence between the phoneme and the viseme, that is, the mapping relationship, based on the drive parameter corresponding to each phoneme.

For example, the mapping relationship may be a mapping value from the phoneme to the viseme. For example, a mapping value of a premaxilla is 0.11426107876499998, a mapping value of a mandible is 0.45334974318700005, and the like.

Step 205: The electronic device drives the face of the virtual image based on the first drive parameter sequence.

In this embodiment of this application, after obtaining the first drive parameter sequence, the electronic device may input the first drive parameter sequence into a drive engine, so that the face of the virtual image can be driven based on the first drive parameter sequence, to perform lip-shape movement.

For example, the drive engine may be a three-dimensional (3D) engine.

In the method for driving a face of a virtual image provided in this embodiment of this application, the electronic device may obtain the first input information, where the first input information includes at least one piece of the speech information and the text information; generate the speech-text alignment information based on the first input information; determine, based on the speech-text alignment information, the N phonemes corresponding to the first input information, where the phonemes include the phoneme information, and N is an integer greater than 1; generate the first drive parameter sequence based on the phonemes, the phoneme information, and the mapping relationship between the facial viseme in the virtual image and the phoneme; and drive the face of the virtual image based on the first drive parameter sequence. In this way, because the phoneme information of the N phonemes can accurately express a facial mouth shape, corresponding to the first input information, of the virtual image, a more accurate first drive parameter sequence can be generated to drive the face of the virtual image. Therefore, an uncoordinated action of the presented facial mouth shape of the virtual image is avoided, and a final synchronization effect is improved.

Optionally, in this embodiment of this application, "the electronic device generates a first drive parameter sequence based on the phonemes, the phoneme information, and a mapping relationship between a facial viseme in the virtual image and the phoneme" in step 204 may include the following step 204*a* and step 204*b*.

Step 204*a*: The electronic device determines, based on the phonemes and the phoneme information, an importance weight and an intensity weight that correspond to the phoneme.

In this embodiment of this application, the importance weight is for representing an importance degree of the phoneme in driving the face of the virtual image.

In this embodiment of this application, the intensity weight is for representing an intensity degree of each phoneme among the N phonemes.

In this embodiment of this application, the electronic device may set a corresponding importance weight for each phoneme group based on the foregoing phoneme group. For example, for the importance weight, weights of the initial, the single vowel, the compound vowel, the alveolar nasal vowel, and the velar nasal vowel are respectively set to (1.0, 0.9, 0.6, 0.5, 0.5).

Step 204*b*: The electronic device generates the first drive parameter sequence based on the importance weight, the intensity weight, the phonemes, the phoneme information, and the mapping relationship between the facial viseme in the virtual image and the phoneme.

In this way, the first drive parameter sequence is generated based on the importance weight and the intensity weight of the phoneme, so that a phoneme with a high intensity degree and low importance can be discarded, to avoid jitter of an action of the virtual image driven by the generated first drive parameter sequence.

Optionally, in this embodiment of this application, "the electronic device generates the first drive parameter sequence based on the importance weight, the intensity weight, the phonemes, the phoneme information, and the mapping relationship between the facial viseme in the virtual image and the phoneme" in step 204*b* may include the following step 204*b*1 to step 204*b*3.

Step 204*b*1: The electronic device obtains a phoneme sequence corresponding to the phonemes.

In this embodiment of this application, the phoneme sequence is for indicating an order of the N phonemes.

In this embodiment of this application, the electronic device may sort the N phonemes based on the N generated phonemes and according to a word order of the input information, to obtain the phoneme sequence.

Step 204*b*2: The electronic device generates a first phoneme sequence based on the phoneme sequence, the importance weight, and the intensity weight.

In this embodiment of this application, the electronic device may discard, based on the phoneme sequence, the importance weight, and the intensity weight, a phoneme with high density and a low importance degree, to generate a new phoneme sequence, namely, the first phoneme sequence.

Step 204*b*3: The electronic device converts the first phoneme sequence based on the phoneme information and the mapping relationship between the facial viseme in the virtual image and the phoneme, to generate the first drive parameter sequence.

For example, the electronic device may calculate the first drive parameter sequence through a formula (1). The formula (1) is as follows:

$$v_i = \min(S(p_i) * w_{1i} * w_{2i}, 1.0) \quad \text{Formula (1)}$$

$w_{1i}$ is the importance weight, $w_{2i}$ is the intensity weight, and S is the mapping relationship.

In this way, the phoneme sequence is converted into a viseme parameter sequence having a time-sequence feature, so that the electronic device can drive the virtual image based on the viseme parameter sequence, to improve fineness of driving the virtual image.

Optionally, in this embodiment of this application, "the electronic device drives the face of the virtual image based on the first drive parameter sequence" in step 205 may include the following step 205*a* to step 205*c*.

Step 205*a*: The electronic device separately performs time-domain feature smoothing processing on drive parameters corresponding to all the phonemes in the first drive parameter sequence, to obtain a smoothed second drive parameter sequence.

In this embodiment of this application, after obtaining the viseme parameter sequence, the electronic device may separately perform smoothing processing on viseme parameters of different parts.

For example, the smoothing processing may be smoothing performed by using a convolution smoothing (Savitzky-Golay, SG) algorithm.

For example, the electronic device may smooth, by using each text in the text information as a unit, the drive parameter corresponding to the phoneme corresponding to each text, that is, apply the SG algorithm to the drive parameter corresponding to the phoneme of each text, to ensure that a facial viseme corresponding to each text is more natural, and finally obtain the second drive parameter sequence.

Step 205*b*: The electronic device performs time-domain feature smoothing processing on the second drive parameter sequence, to obtain a third drive parameter sequence.

In this embodiment of this application, the face drive data is related to the third drive parameter sequence.

For example, after obtaining the second drive parameter sequence, the electronic device may apply the SG algorithm to the entire second drive parameter sequence, to ensure that a facial viseme corresponding to the entire input information is more natural, and obtain the third drive parameter sequence.

For example, a drive parameter corresponding to a chin part is smoothed, and a drive parameter sequence of the chin part is obtained through a formula (2). The formula (2) is as follows:

$$V_{s_{chin}} = SG((SG(v_1), \ldots, SG(v_i))) \qquad \text{Formula (2)}$$

i represents a quantity of texts in the input information.

The electronic device may generate the final third drive parameter sequence by substituting drive parameter sequences corresponding to different parts into a formula (3). The formula (3) is as follows:

$$V_s = \{V_{s_{chin}}, V_{s_{mouth}}, V_{s_{another}}\} \qquad \text{Formula (3)}$$

Step 205*c*: The electronic device drives the face of the virtual image based on the third drive parameter sequence.

In this embodiment of this application, after obtaining the third drive parameter sequence, the electronic device may input the third drive parameter sequence into the 3D engine, so that the face of the virtual image can be driven based on the third drive parameter sequence, to perform lip-shape movement.

In this way, smoothing processing is first performed on the drive parameter corresponding to each phoneme, and smoothing processing is performed on the entire drive parameter sequence, so that the generated drive parameter sequence is finer, and a problem that the virtual image is unnatural and jitters because the drive parameter jumps at transition stages of different phonemes is avoided.

Optionally, in this embodiment of this application, "the electronic device drives the face of the virtual image based on the first drive parameter sequence" in step 205 may include the following step 205*d* to step 205*g*.

Step 205*d*: The electronic device generates, based on short-time energy of the first input information, an energy-coefficient weight corresponding to each phoneme.

In this embodiment of this application, the short-time energy includes a voiceless sound part and a voiced sound part of the speech information.

It should be noted that energy corresponding to the voiced sound part is higher than energy corresponding to the voiceless sound part.

In this embodiment of this application, the energy-coefficient weight is for representing weights of the voiceless sound part and the voiced sound part in the speech information. In other words, a larger energy-coefficient weight indicates a higher volume of the corresponding speech information.

Step 205*e*: The electronic device obtains, based on a phoneme sequence corresponding to the phonemes in the first input information and the energy-coefficient weight, an energy-coefficient weight sequence corresponding to the phonemes.

In this embodiment, the electronic device may process the energy-coefficient weight based on the order indicated by the phoneme sequence, to obtain the energy-coefficient weight sequence.

For example, the electronic device may obtain the energy-coefficient weight sequence through a formula (4). The formula (4) is as follows:

$$W_E = \frac{E}{\text{mean}^{(E)}} \qquad \text{Formula (4)}$$

Step 205*f*: The electronic device generates a fourth drive parameter sequence based on the energy-coefficient weight sequence, a strength parameter of the facial viseme in the virtual image, and the first drive parameter sequence.

In this embodiment of this application, the face drive data is related to the fourth drive parameter sequence.

In this embodiment of this application, the strength parameter of the facial viseme is for representing emotion information corresponding to the drive parameter sequence.

For example, the emotion information includes happiness, sadness, anger, and calmness.

For example, the electronic device may customize different strength parameters for the drive parameter sequences of the different parts. Then, the electronic device generates the fourth drive parameter sequence through a formula (5). The formula (5) is as follows:

$$V_{final} = W^{E^{*\{w_{st1} V_{s_{chin}}, w_{st2} V_{s_{mouth}}, w_{st3} V_{s_{another}}\}}} \qquad \text{Formula (5)}$$

Step 205*g*: The electronic device drives the face of the virtual image based on the fourth drive parameter sequence.

In this embodiment of this application, after obtaining the fourth drive parameter sequence, the electronic device may input the fourth drive parameter sequence into the 3D engine, so that the face of the virtual image can be driven based on the fourth drive parameter sequence, to perform lip-shape movement.

In this embodiment of this application, the electronic device may discard, based on the importance weight and the intensity weight of the phoneme, a phoneme that contributes little to movement of the lip shape, to resolve a problem that the lip shape jitters. In addition, a phoneme-to-viseme mapping solution is established. The face drive data may be directly generated based on the phoneme, and then the drive parameter sequence is smoothed according to smoothing policies of different granularities, so that the movement of the lip shape is more natural. Finally, the drive parameter sequence may further be dynamically adjusted based on the speech information and according to a built-in policy, to implement different speaking styles.

In this way, the parameters for representing the volume of the speech information and emotion of the virtual image are added to the first drive parameter sequence, so that an effect of finally driving the virtual image is more natural.

Optionally, in this embodiment of this application, "the electronic device generates speech-text alignment information based on the first input information" in step 202 may include step 202*a* and step 202*b*.

Step 202*a*: The electronic device extracts acoustic feature information corresponding to first speech information.

In this embodiment of this application, the first speech information is the inputted speech information or speech information converted from the text information.

In this embodiment of this application, the converting the text information into the speech information may include: passing the text information through a text-to-speech (TTS) interface to generate a virtual speech corresponding to the text information.

In this embodiment of this application, the acoustic feature information is for representing a pitch, a sound intensity, and a timbre of the first speech information.

In this embodiment of this application, the electronic device may input the input information into a feature extraction model, to extract a corresponding acoustic feature of the speech.

For example, the feature extraction model may include linear predictive encoding and a Mel spectrum.

Step 202*b*: The electronic device performs, based on the acoustic feature information, speech-text alignment on the first speech information and text information that corresponds to the first speech information, to generate the speech-text alignment information.

In this embodiment of this application, the electronic device may input the acoustic feature information and the text information into a statistical model or a deep learning method model for dynamic matching, to generate the speech-text alignment information.

In this way, the speech information is aligned with the corresponding text information by extracting the acoustic feature information in the speech information, so that the electronic device can more accurately obtain content included in the input information.

Optionally, in this embodiment of this application, the phoneme information includes duration of each phoneme. "The electronic device determines, based on the phonemes and the phoneme information, an intensity weight that corresponds to the phoneme" in step 204*a* may include the following step 204*al* and step 204*a*2.

Step 204*al*: The electronic device divides duration corresponding to the first input information into P time periods based on the duration of each phoneme.

P is an integer greater than 1.

In this embodiment of this application, the duration may be from start time to end time of each phoneme.

In this embodiment of this application, the duration corresponding to the input information may be from start time to end time corresponding to the speech information.

In this embodiment of this application, the P time periods may be time periods with a same time length.

Step 204*a*2: The electronic device determines, based on information about an intensity degree of each phoneme included in each of the P time periods, the intensity weight that corresponds to the phoneme.

In this embodiment of this application, the information about the intensity degree is for representing quantities of all the phonemes in each time period.

For example, the electronic device may calculate the intensity weight through a formula (6). The formula (6) is as follows:

$$W_{2i} = \left(\frac{t_i}{t_{max}} + \frac{t_i}{T}\right)/(n+1) \qquad \text{Formula (6)}$$

T represents a time length corresponding to the P time periods, $t_i$ represents an $i^{th}$ phoneme of the N phonemes, $t_{max}$ represents duration of a longest phoneme in the time length T, and P is the P time periods.

In this way, the electronic device may discard, based on the calculated intensity weight, a phoneme with high density but having small impact on the facial viseme, to avoid the problem that the lip shape jitters.

An execution body of the method for driving a face of a virtual image provided in this embodiment of this application may be an apparatus for driving a face of a virtual image. In this embodiment of this application, the apparatus for driving a face of a virtual image provided in this embodiment of this application is described by using an example in which the apparatus for driving a face of a virtual image performs the method for driving a face of a virtual image.

Figure 2:
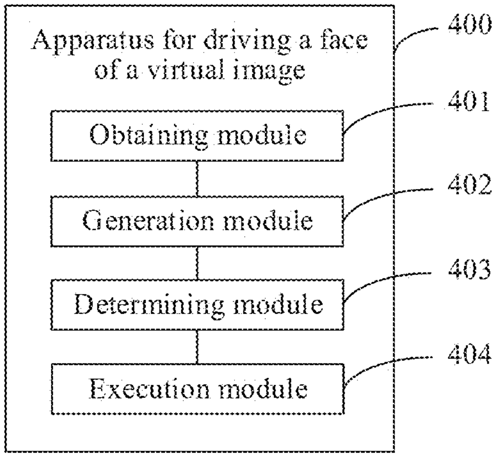
FIG. 2 is a schematic diagram of a structure of an apparatus for driving a face of a virtual image according to an embodiment of this application.

An embodiment of this application provides an apparatus for driving a face of a virtual image. As shown in FIG. 2, the apparatus 400 for driving a face of a virtual image includes an obtaining module 401, a generation module 402, a determining module 403, and an execution module 404. The obtaining module 401 is configured to obtain first input information, where the first input information includes at least one piece of speech information and text information. The generation module 402 is configured to generate speech-text alignment information based on the first input information obtained by the obtaining module 401. The determining module 403 is configured to determine, based on the speech-text alignment information generated by the generation module 402, N phonemes corresponding to the first input information, where the phonemes include phoneme information, and N is an integer greater than 1. The generation module 402 is further configured to generate a first drive parameter sequence based on the phonemes determined by the determining module 403, the phoneme information, and a mapping relationship between a facial viseme in the virtual image and the phoneme. The execution module 404 is configured to drive the face of the virtual image based on the first drive parameter sequence generated by the generation module 402.

Optionally, in this embodiment of this application, the determining module 403 is further configured to determine, based on the phonemes and the phoneme information, an importance weight and an intensity weight that correspond to the phoneme, where the importance weight is for representing an importance degree of the phoneme in driving the face of the virtual image, and the intensity weight is for representing an intensity degree of each phoneme among the N phonemes. The generation module 402 is configured to generate the first drive parameter sequence based on the importance weight, the intensity weight, and the phonemes that are determined by the determining module 403, the phoneme information, and the mapping relationship between the facial viseme in the virtual image and the phoneme.

Optionally, in this embodiment of this application, the obtaining module 401 is further configured to obtain a phoneme sequence corresponding to the phonemes. The generation module 402 is configured to generate a first phoneme sequence based on the phoneme sequence obtained by the obtaining module 401, the importance weight, and the intensity weight; and convert the first phoneme sequence based on the phoneme information and the mapping relationship between the facial viseme in the virtual image and the phoneme, to generate the first drive parameter sequence.

Optionally, in this embodiment of this application, the execution module 404 is configured to separately perform time-domain feature smoothing processing on drive parameters corresponding to all the phonemes in the first drive parameter sequence generated by the generation module 402, to obtain a smoothed second drive parameter sequence; perform time-domain feature smoothing processing on the second drive parameter sequence, to obtain a third drive parameter sequence; and drive the face of the virtual image based on the third drive parameter sequence.

Optionally, in this embodiment of this application, the execution module 404 is configured to generate, based on short-time energy of the first input information, an energy-coefficient weight corresponding to each phoneme; obtain, based on a phoneme sequence corresponding to the phonemes in the first input information and the energy-coefficient weight, an energy-coefficient weight sequence corresponding to the phonemes; generate a fourth drive parameter sequence based on the energy-coefficient weight sequence, a strength parameter of the facial viseme in the virtual image, and the first drive parameter sequence; and drive the face of the virtual image based on the fourth drive parameter sequence.

Optionally, in this embodiment of this application, the apparatus 400 for driving a face of a virtual image further includes an extraction module. The extraction module is configured to extract acoustic feature information corresponding to first speech information, where the first speech information is the inputted speech information or speech information converted from the text information. The generation module 402 is configured to perform, based on the acoustic feature information extracted by the extraction module, speech-text alignment on the first speech information and text information that corresponds to the first speech information, to generate the speech-text alignment information.

Optionally, in this embodiment of this application, the phoneme information includes duration of each phoneme. The determining module 403 is configured to divide duration corresponding to the first input information into P time periods based on the duration of each phoneme, where P is an integer greater than 1; and determine, based on information about an intensity degree of each phoneme comprised in each of the P time periods, the intensity weight that corresponds to the phoneme.

In the apparatus for driving a face of a virtual image provided in this embodiment of this application, the apparatus for driving a face of a virtual image may obtain the first input information, where the first input information includes at least one piece of the speech information and the text information; generate the speech-text alignment information based on the first input information; determine, based on the speech-text alignment information, the N phonemes corresponding to the first input information, where the phonemes include the phoneme information, and N is an integer greater than 1; generate the first drive parameter sequence based on the phonemes, the phoneme information, and the mapping relationship between the facial viseme in the virtual image and the phoneme; and drive the face of the virtual image based on the first drive parameter sequence. In this way, because the phoneme information of the N phonemes can accurately express a facial mouth shape, corresponding to the first input information, of the virtual image, a more accurate first drive parameter sequence can be generated to drive the face of the virtual image. Therefore, an uncoordinated action of the presented facial mouth shape of the virtual image is avoided, and a final synchronization effect is improved.

The apparatus for driving a face of a virtual image in this embodiment of this application may be an electronic device, or may be a component, for example, an integrated circuit or a chip, in the electronic device. The electronic device may be a terminal, or may be another device other than the terminal. For example, the electronic device may be a mobile phone, a tablet computer, a notebook computer, a palmtop computer, a vehicle-mounted electronic device, a mobile Internet device (MID), an augmented reality (AR)/virtual reality (VR) device, a robot, a wearable device, an ultra-mobile personal computer (UMPC), a netbook, or a personal digital assistant (PDA), or may be a server, network attached storage (NAS), a personal computer (PC), a television (TV), a teller machine, or a self-service machine. This is not specifically limited in this embodiment of this application.

The apparatus for driving a face of a virtual image in this embodiment of this application may be an apparatus with an operating system. The operating system may be an Android operating system, an iOS operating system, or another possible operating system. This is not specifically limited in this embodiment of this application.

The apparatus for driving a face of a virtual image provided in this embodiment of this application can implement the processes implemented in the method embodiment of FIG. 1. To avoid repetition, details are not described herein again.

Figure 3:
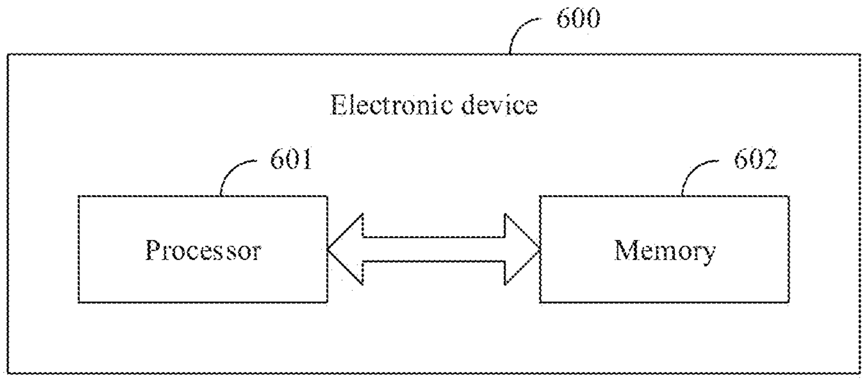
FIG. 3 is a schematic diagram of a structure of an electronic device according to an embodiment of this application.

Optionally, as shown in FIG. 3, an embodiment of this application further provides an electronic device 600, including a processor 601 and a memory 602. The memory 602 stores a program or instructions executable on the processor 601. When the program or instructions are executed by the processor 601, steps of the embodiments of the method for driving a face of a virtual image are implemented, and a same technical effect can be achieved. To avoid repetition, details are not described herein again.

It should be noted that the electronic device in this embodiment of this application includes the mobile electronic device and the non-mobile electronic device.

Figure 4:
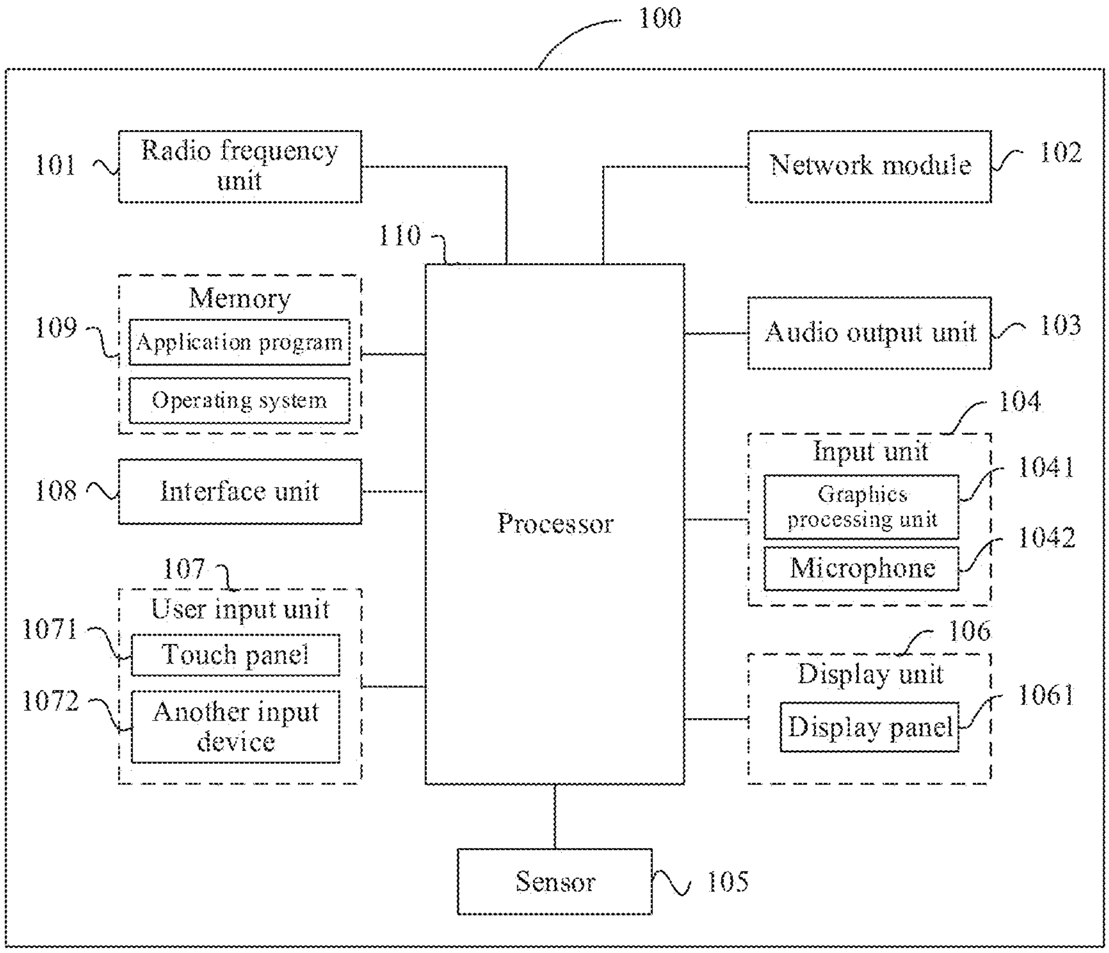
FIG. 4 is a schematic diagram of hardware of an electronic device according to an embodiment of this application.

FIG. 4 is a schematic diagram of a hardware structure of an electronic device according to an embodiment of this application.

An electronic device 100 includes, but is not limited to, components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the electronic device 100 may further include a power supply (such as a battery) for supplying power to the components. The power supply may be logically connected to the processor 110 through a power supply management system, to implement functions such as charging, discharging, and power consumption management through the power supply management system. The structure of the electronic device shown in FIG. 4 constitutes no limitation on the electronic device, and the electronic device may include more or fewer components than those shown in the figure, or some components may be combined, or a different component deployment may be used. Details are not described herein again.

The processor 110 is configured to obtain first input information, where the first input information includes at least one piece of speech information and text information; generate speech-text alignment information based on the first input information; determine, based on the speech-text alignment information, N phonemes corresponding to the first input information, where the phonemes include phoneme information, and N is an integer greater than 1; generate a first drive parameter sequence based on the phonemes, the phoneme information, and a mapping relationship between a facial viseme in the virtual image and the phoneme; and drive the face of the virtual image based on the first drive parameter sequence.

Optionally, in this embodiment of this application, the processor 110 is further configured to determine, based on the phonemes and the phoneme information, an importance weight and an intensity weight that correspond to the phoneme, where the importance weight is for representing an importance degree of the phoneme in driving the face of the virtual image, and the intensity weight is for representing an intensity degree of each phoneme among the N phonemes. The processor 110 is configured to generate the first drive parameter sequence based on the importance weight, the intensity weight, the phonemes, the phoneme information, and the mapping relationship between the facial viseme in the virtual image and the phoneme.

Optionally, in this embodiment of this application, the processor 110 is further configured to obtain a phoneme sequence corresponding to the phonemes. The processor 110 is configured to generate a first phoneme sequence based on the phoneme sequence, the importance weight, and the intensity weight; and convert the first phoneme sequence based on the phoneme information and the mapping relationship between the facial viseme in the virtual image and the phoneme, to generate the first drive parameter sequence.

Optionally, in this embodiment of this application, the processor 110 is configured to separately perform time-domain feature smoothing processing on drive parameters corresponding to all the phonemes in the first drive parameter sequence, to obtain a smoothed second drive parameter sequence; perform time-domain feature smoothing processing on the second drive parameter sequence, to obtain a third drive parameter sequence; and drive the face of the virtual image based on the third drive parameter sequence.

Optionally, in this embodiment of this application, the processor 110 is configured to generate, based on short-time energy of the first input information, an energy-coefficient weight corresponding to each phoneme; obtain, based on a phoneme sequence corresponding to the phonemes in the first input information and the energy-coefficient weight, an energy-coefficient weight sequence corresponding to the phonemes; generate a fourth drive parameter sequence based on the energy-coefficient weight sequence, a strength parameter of the facial viseme in the virtual image, and the first drive parameter sequence; and drive the face of the virtual image based on the fourth drive parameter sequence.

Optionally, in this embodiment of this application, the processor 110 is further configured to extract acoustic feature information corresponding to first speech information, where the first speech information is the inputted speech information or speech information converted from the text information. The processor 110 is configured to perform, based on the acoustic feature information, speech-text alignment on the first speech information and text information that corresponds to the first speech information, to generate the speech-text alignment information.

Optionally, in this embodiment of this application, the phoneme information includes duration of each phoneme. The processor 110 is configured to divide duration corresponding to the first input information into P time periods based on the duration of each phoneme, where P is an integer greater than 1; and determine, based on information about an intensity degree of each phoneme included in each of the P time periods, the intensity weight that corresponds to the phoneme.

In the electronic device provided in this embodiment of this application, the electronic device may obtain the first input information, where the first input information includes at least one piece of the speech information and the text information; generate the speech-text alignment information based on the first input information; determine, based on the speech-text alignment information, the N phonemes corresponding to the first input information, where the phonemes include the phoneme information, and N is an integer greater than 1; generate the first drive parameter sequence based on the phonemes, the phoneme information, and the mapping relationship between the facial viseme in the virtual image and the phoneme; and drive the face of the virtual image based on the first drive parameter sequence. In this way, because the phoneme information of the N phonemes can accurately express a facial mouth shape, corresponding to the first input information, of the virtual image, a more accurate first drive parameter sequence can be generated to drive the face of the virtual image. Therefore, an uncoordinated action of the presented facial mouth shape of the virtual image is avoided, and a final synchronization effect is improved.

It should be understood that, in this embodiment of this application, the input unit 104 may include a graphics processing unit (GPU) 1041 and a microphone 1042. The graphics processing unit 1041 processes picture data of a static image or a video that is obtained by a picture capture apparatus (such as a camera) in a video capture mode or a picture capture mode. The display unit 106 may include a display panel 1061, and the display panel 1061 may be configured in a form such as a liquid crystal display or an organic light-emitting diode. The user input unit 107 includes at least one of a touch panel 1071 and another input device 1072. The touch panel 1071 is also referred to as a touchscreen. The touch panel 1071 may include two parts: a touch detection apparatus and a touch controller. The another input device 1072 may include, but is not limited to, a physical keyboard, a functional key (such as a volume control key or a switch key), a trackball, a mouse, and a joystick. Details are not described herein.

The memory 109 may be configured to store a software program and various data. The memory 109 may mainly include a first storage area for storing a program or instructions and a second storage area for storing data. The first storage area may store an operating system, an application program or instructions required by at least one function (for example, a sound playback function or a picture playback function), and the like. In addition, the memory 109 may include a volatile memory or a non-volatile memory, or the memory 109 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM), or a direct rambus random access memory (DRRAM). The memory 109 in this embodiment of this application includes, but is not limited to, these memories and a memory of any other suitable type.

The processor 110 may include one or more processing units. Optionally, the processor 110 integrates an application processor and a modem processor. The application processor mainly processes and involves in operations of the operating system, a user interface, an application program, and the like. The modem processor, for example, a baseband processor, mainly processes a wireless communication signal. Alternatively, the modem processor may not be integrated into the processor 110.

An embodiment of this application further provides a non-transitory readable storage medium. The non-transitory readable storage medium stores a program or instructions. When the program or the instructions are executed by a processor, processes of the embodiment of the method for driving a face of a virtual image are implemented, and same technical effects can be achieved. To avoid repetition, details are not described herein again.

The processor is the processor in the electronic device described in the foregoing embodiment. The non-transitory readable storage medium includes a non-transitory computer-readable storage medium, such as a computer read-only memory ROM, a random access memory RAM, a magnetic disk, or an optical disc.

An embodiment of this application further provides a chip. The chip includes a processor and a communication interface. The communication interface is coupled to the processor, and the processor is configured to run a program or instructions, to implement processes of the embodiment of the method for driving a face of a virtual image, and same technical effects can be achieved. To avoid repetition, details are not described herein again.

It should be understood that the chip mentioned in this embodiment of this application may also be referred to as a system-level chip, a system chip, a chip system, a system-on-chip, or the like.

An embodiment of this application provides a computer program product. The program product is stored in a non-transitory storage medium. The program product is executed by at least one processor to implement processes of the embodiment of the method for driving a face of a virtual image, and same technical effects can be achieved. To avoid repetition, details are not described herein again.

It needs to be noted that, in this specification, terms "include", "comprise", or any other variant thereof are intended to cover non-exclusive inclusion, so that a process, method, product, or apparatus that includes a series of elements includes not only the elements, but also another element not expressly listed, or an element inherent to such a process, method, product, or apparatus. An element defined by a statement "includes a . . . " does not exclude, without more limitations, existence of another same element in a process, method, product, or apparatus that includes the element. In addition, it should be noted that the scopes of the method and apparatus in the implementations of this application are not limited to performing the functions in the order shown or discussed, and the functions may alternatively be performed in a substantially simultaneous manner or in a reverse order according to the functions involved. For example, the methods described may be performed in an order different from the order described, and various steps may further be added, omitted, or combined. In addition, features described with reference to some examples may be combined in another example.

According to the foregoing descriptions of the implementations, a person skilled in the art may clearly understand that the methods in the embodiments may be implemented by using software plus a necessary universal hardware platform, and certainly may alternatively be implemented by hardware. However, in many cases, the former is a better implementation. Based on this understanding, the technical solutions of this application essentially or a part contributing to the prior art may be implemented in a form of a computer software product. The computer software product is stored in a non-transitory storage medium (such as a ROM/RAM, a magnetic disk, or an optical disc), and includes several instructions to enable a terminal (which may be a mobile phone, a computer, a server, a network device, or the like) to perform the methods in the embodiments of this application.

The foregoing describes the embodiments of this application with reference to the accompanying drawings. However, this application is not limited to the foregoing implementations. The foregoing implementations are merely examples, but are not limitative. Inspired by this application, a person of ordinary skill in the art may further make modifications without departing from the purposes of this application and the protection scope of the claims, and all the modifications shall fall within the protection of this application.

What is claimed is:

1. A method for driving a face of a virtual image, wherein the method comprises:

obtaining first input information, wherein the first input information comprises at least one piece of speech information and text information;

generating speech-text alignment information based on the first input information;

determining, based on the speech-text alignment information, N phonemes corresponding to the first input information, wherein the phonemes comprise phoneme information, and N is an integer greater than 1;

generating a first drive parameter sequence based on the phonemes, the phoneme information, and a mapping relationship between a facial viseme in the virtual image and a phoneme; and driving the face of the virtual image based on the first drive parameter sequence.

2. The method according to claim 1, wherein the generating a first drive parameter sequence based on the phonemes, the phoneme information, and a mapping relationship between a facial viseme in the virtual image and a phoneme comprises:

determining, based on the phonemes and the phoneme information, an importance weight and an intensity weight that correspond to the phoneme, wherein the importance weight is for representing an importance degree of the phoneme in driving the face of the virtual image, and the intensity weight is for representing an intensity degree of each phoneme among the N phonemes; and generating the first drive parameter sequence based on the importance weight, the intensity weight, the phonemes, the phoneme information, and the mapping relationship between the facial viseme in the virtual image and the phoneme.

3. The method according to claim 2, wherein the generating the first drive parameter sequence based on the importance weight, the intensity weight, the phonemes, the phoneme information, and the mapping relationship between the facial viseme in the virtual image and the phoneme comprises:

obtaining a phoneme sequence corresponding to the phonemes;

generating a first phoneme sequence based on the phoneme sequence, the importance weight, and the intensity weight; and converting the first phoneme sequence based on the phoneme information and the mapping relationship between the facial viseme in the virtual image and the phoneme, to generate the first drive parameter sequence.

4. The method according to claim 1, wherein the driving the face of the virtual image based on the first drive parameter sequence comprises:

separately performing time-domain feature smoothing processing on drive parameters corresponding to all the phonemes in the first drive parameter sequence, to obtain a smoothed second drive parameter sequence;

performing time-domain feature smoothing processing on the second drive parameter sequence, to obtain a third drive parameter sequence; and driving the face of the virtual image based on the third drive parameter sequence.

5. The method according to claim 1, wherein the driving the face of the virtual image based on the first drive parameter sequence comprises:

generating, based on short-time energy of the first input information, an energy-coefficient weight corresponding to each phoneme;

obtaining, based on a phoneme sequence corresponding to the phonemes in the first input information and the energy-coefficient weight, an energy-coefficient weight sequence corresponding to the phonemes;

generating a fourth drive parameter sequence based on the energy-coefficient weight sequence, a strength parameter of the facial viseme in the virtual image, and the first drive parameter sequence; and driving the face of the virtual image based on the fourth drive parameter sequence.

6. The method according to claim 1, wherein the generating speech-text alignment information based on the first input information comprises:

extracting acoustic feature information corresponding to first speech information, wherein the first speech information is inputted speech information or speech information converted from the text information; and performing, based on the acoustic feature information, speech-text alignment on the first speech information and text information that corresponds to the first speech information, to generate the speech-text alignment information.

7. The method according to claim 2, wherein the phoneme information comprises duration of each phoneme; and the determining, based on the phonemes and the phoneme information, an intensity weight that corresponds to the phoneme comprises:

dividing duration corresponding to the first input information into P time periods based on the duration of each phoneme, wherein P is an integer greater than 1; and determining, based on information about an intensity degree of each phoneme comprised in each of the P time periods, the intensity weight that corresponds to the phoneme.

8. An electronic device, comprising a processor and a memory, wherein the memory stores a program or instructions that executable on the processor, and the program or instructions, when executed by the processor, cause the electronic device to perform:

obtaining first input information, wherein the first input information comprises at least one piece of speech information and text information;

generating speech-text alignment information based on the first input information;

determining, based on the speech-text alignment information, N phonemes corresponding to the first input information, wherein the phonemes comprise phoneme information, and N is an integer greater than 1;

generating a first drive parameter sequence based on the phonemes, the phoneme information, and a mapping relationship between a facial viseme in the virtual image and a phoneme; and driving the face of the virtual image based on the first drive parameter sequence.

9. The electronic device according to claim 8, wherein the program or instructions, when executed by the processor, cause the electronic device to perform:

determining, based on the phonemes and the phoneme information, an importance weight and an intensity weight that correspond to the phoneme, wherein the importance weight is for representing an importance degree of the phoneme in driving the face of the virtual image, and the intensity weight is for representing an intensity degree of each phoneme among the N phonemes; and generating the first drive parameter sequence based on the importance weight, the intensity weight, the phonemes, the phoneme information, and the mapping relationship between the facial viseme in the virtual image and the phoneme.

10. The electronic device according to claim 9, wherein the program or instructions, when executed by the processor, cause the electronic device to perform:

obtaining a phoneme sequence corresponding to the phonemes;

generating a first phoneme sequence based on the phoneme sequence, the importance weight, and the intensity weight; and converting the first phoneme sequence based on the phoneme information and the mapping relationship between the facial viseme in the virtual image and the phoneme, to generate the first drive parameter sequence.

11. The electronic device according to claim 8, wherein the program or instructions, when executed by the processor, cause the electronic device to perform:

separately performing time-domain feature smoothing processing on drive parameters corresponding to all the phonemes in the first drive parameter sequence, to obtain a smoothed second drive parameter sequence;

performing time-domain feature smoothing processing on the second drive parameter sequence, to obtain a third drive parameter sequence; and driving the face of the virtual image based on the third drive parameter sequence.

12. The electronic device according to claim 8, wherein the program or instructions, when executed by the processor, cause the electronic device to perform:

generating, based on short-time energy of the first input information, an energy-coefficient weight corresponding to each phoneme;

obtaining, based on a phoneme sequence corresponding to the phonemes in the first input information and the energy-coefficient weight, an energy-coefficient weight sequence corresponding to the phonemes;

generating a fourth drive parameter sequence based on the energy-coefficient weight sequence, a strength parameter of the facial viseme in the virtual image, and the first drive parameter sequence; and driving the face of the virtual image based on the fourth drive parameter sequence.

13. The electronic device according to claim 8, wherein the program or instructions, when executed by the processor, cause the electronic device to perform:

extracting acoustic feature information corresponding to first speech information, wherein the first speech information is inputted speech information or speech information converted from the text information; and performing, based on the acoustic feature information, speech-text alignment on the first speech information and text information that corresponds to the first speech information, to generate the speech-text alignment information.

14. The electronic device according to claim 9, wherein the phoneme information comprises duration of each phoneme; and the program or instructions, when executed by the processor, cause the electronic device to perform:

dividing duration corresponding to the first input information into P time periods based on the duration of each phoneme, wherein P is an integer greater than 1; and determining, based on information about an intensity degree of each phoneme comprised in each of the P time periods, the intensity weight that corresponds to the phoneme.

15. A non-transitory readable storage medium, storing a program or instructions, wherein the program or instructions, when executed by a processor of an electronic device, cause the electronic device to perform:

obtaining first input information, wherein the first input information comprises at least one piece of speech information and text information;

generating speech-text alignment information based on the first input information;

determining, based on the speech-text alignment information, N phonemes corresponding to the first input information, wherein the phonemes comprise phoneme information, and N is an integer greater than 1;

generating a first drive parameter sequence based on the phonemes, the phoneme information, and a mapping relationship between a facial viseme in the virtual image and a phoneme; and driving the face of the virtual image based on the first drive parameter sequence.

16. The non-transitory readable storage medium according to claim 15, wherein the program or instructions, when executed by the processor of the electronic device, cause the electronic device to perform:

determining, based on the phonemes and the phoneme information, an importance weight and an intensity weight that correspond to the phoneme, wherein the importance weight is for representing an importance degree of the phoneme in driving the face of the virtual image, and the intensity weight is for representing an intensity degree of each phoneme among the N phonemes; and generating the first drive parameter sequence based on the importance weight, the intensity weight, the phonemes, the phoneme information, and the mapping relationship between the facial viseme in the virtual image and the phoneme.

17. The non-transitory readable storage medium according to claim 16, wherein the program or instructions, when executed by the processor of the electronic device, cause the electronic device to perform:

obtaining a phoneme sequence corresponding to the phonemes;

generating a first phoneme sequence based on the phoneme sequence, the importance weight, and the intensity weight; and converting the first phoneme sequence based on the phoneme information and the mapping relationship between the facial viseme in the virtual image and the phoneme, to generate the first drive parameter sequence.

18. The non-transitory readable storage medium according to claim 15, wherein the program or instructions, when executed by the processor of the electronic device, cause the electronic device to perform:

separately performing time-domain feature smoothing processing on drive parameters corresponding to all the phonemes in the first drive parameter sequence, to obtain a smoothed second drive parameter sequence;

performing time-domain feature smoothing processing on the second drive parameter sequence, to obtain a third drive parameter sequence; and driving the face of the virtual image based on the third drive parameter sequence.

19. The non-transitory readable storage medium according to claim 15, wherein the program or instructions, when executed by the processor of the electronic device, cause the electronic device to perform:

generating, based on short-time energy of the first input information, an energy-coefficient weight corresponding to each phoneme;

obtaining, based on a phoneme sequence corresponding to the phonemes in the first input information and the energy-coefficient weight, an energy-coefficient weight sequence corresponding to the phonemes;

generating a fourth drive parameter sequence based on the energy-coefficient weight sequence, a strength parameter of the facial viseme in the virtual image, and the first drive parameter sequence; and driving the face of the virtual image based on the fourth drive parameter sequence.

20. The non-transitory readable storage medium according to claim 15, wherein the program or instructions, when executed by the processor of the electronic device, cause the electronic device to perform:

extracting acoustic feature information corresponding to first speech information, wherein the first speech information is the speech information or speech information converted from the text information; and performing, based on the acoustic feature information, speech-text alignment on the first speech information and text information that corresponds to the first speech information, to generate the speech-text alignment information.

* * * * *